United States Patent Office 2,694,712
Patented Nov. 16, 1954

2,694,712

2,4-DIALKYL-PYRIMIDYL-6-DIALKYL CARBAMATES

Hans Gysin, Alfred Margot, and Charles Simon, Basel, Switzerland, assignors to J. R. Geigy A. G., Basel, Switzerland, a Swiss firm No Drawing. Application December 9, 1952,
Serial No. 325,012

Claims priority, application Switzerland August 22, 1949

The terminal portion of the term of the patent subsequent to June 22, 1971, has been disclaimed 4 Claims. (Cl. 260—256.4)

This application is a continuation-in-part of our pending application, Ser. No. 178,986, filed August 11, 1950.

The present invention concerns pyrimidyl-(6)-dimethyl carbamates of the general formula:

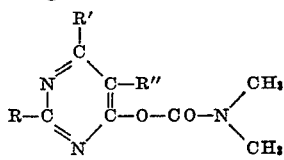

wherein R and R' represent lower alkyl radicals and R" represents hydrogen or a lower alkyl radical.

These new compounds are excellently suited for combatting pests such as insects, especially flies, and other anthropods and also their stages of development.

The new compounds can be produced, for example, by the reaction of dimethyl carbamic acid chloride with alkyl pyrimidones-(6) of the general formula:

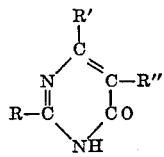

wherein R, R' and R" have the meanings given above. The reaction may be performed in the presence of acid binding agents or with salts of the enol form of the above named compounds.

The reaction may take place in the presence or absence of solvents such as benzene, acetone, dioxan, acetic acid ethyl ester. Acid binding agents which come into consideration are, e. g. potassium carbonate, sodium carbonate, sodium bicarbonate, sodium ethylate or tertiary organic bases such as triethylamine. In particular, the alkali salts are suitable as enol salts.

Further, the new pyrimidyl-(6)-dimethyl carbamates can also be produced by reacting substituted pyrimidones of the formula given above with one molecule of phosgene to form the corresponding chloroformic acid esters of 6-oxypyrimidines and then converting these chloroformic acid esters into the corresponding pyrimidyl-(6)-dimethyl carbamates by treatment with dimethyl-amine.

The first step of the reaction is performed advantageously at room temperature or under gentle cooling, care being taken that there is always an excess of phosgene by adding the substitute pyrimidone, if desired in solution, to a solution of phosgene, e. g. in benzene.

The solutions of the raw chloroformic acid esters obtained can be added direct to the dimethylamine. This reaction occurs at room temperature.

The following examples illustrate the production of the new compounds. Parts are always given as parts by weight, the temperatures are given in degrees centigrade.

*Example 1*

16 parts of the sodium salt of 2-ethyl-4-methyl-6-hydroxy-pyrimidine, which is obtained by reacting 2-ethyl-4-methyl-6-hydroxypyrimidine (2-ethyl-4-methyl-pyrimidone-(6) with sodium methylate, are suspended in benzene. After adding 11 parts of dimethyl carbamic acid chloride, the suspension is boiled for about 12 hours under reflux. After the sodium chloride which forms is filtered off under suction, the benzene is distilled off. On fractionating the residue, 2-ethyl-4-methyl-pyrimidyl-(6)-dimethyl carbamate passes over at 163–166° at 11 mm. pressure in the form of a colourless oil.

2 - n - propyl - 4 - methyl-pyrimidyl - (6) - dimethyl carbamate, B. P. 118–120° at 0.07 mm. pressure, 2.4-dimethyl-pyrimidyl-(6)-dimethyl carbamate, B. P. 111° at 0.05 mm. pressure, 2-isopropyl-4-methyl-pyrimidyl-(6)-dimethyl carbamate, B. P. 112° at 0.5 mm. pressure, 2-n-butyl-4-methyl-pyrimidyl-(6)-dimethyl carbamate, B. P. 136° at 0.2 mm. pressure, 2-methyl-4-ethyl-pyrimidyl-(6)-dimethyl carbamate, 2.4-diethyl-pyrimidyl-(6)-dimethyl carbamate, 2-n-propyl-4-ethyl-pyrimidyl-(6)-dimethyl carbamate, 2-methyl-4-n-propyl-pyrimidyl-(6)-dimethyl carbamate, 2.4-di-n-propyl-pyrimidyl-(6)-dimethyl carbamate, 2-ethyl-4.5-dimethyl-pyrimidyl-(6)-dimethyl carbamate, B. P. 124° at 0.05 mm. pressure, 2.5-diethyl-4-methyl-pyrimidyl-(6)-dimethyl carbamate, B. P. 130° at 0.2 mm. pressure, 2.5-dimethyl-4-ethyl-pyrimidyl-(6)-dimethyl carbamate and 2-methyl-4-n-propyl-5-ethyl-pyrimidyl-(6)-dimethyl carbamate are obtained in an analogous manner.

*Example 2*

30 parts of 2-n-propyl-4-methyl-pyrimidone-(6) are stirred into 250 parts of absolute benzene and the mixture is added slowly while stirring and gently cooling to a solution of 10 parts of phosgene in 60 parts of absolute benzene. The whole is stirred for a further hour at room temperature and then the solution of the reaction product is removed by suction from the precipitated hydrochloride of the 2-n-propyl-4-methyl-6-hydroxypyrimidine.

The filtrate is added dropwise while stirring and cooling to about 20° to 135 parts of an 18.5% solution of dimethylamine in benzene and the whole is stirred for some hours at room temperature. The benzene solution is washed several times with diluted cold caustic soda lye and then with water until the washing water has a neutral reaction. After distilling off the benzene, the 2-n-propyl-4-methyl-pyrimidyl-(6)-dimethyl carbamate remains as an oil which can be distilled in a high vacuum.

The biological properties of the new compounds are useful in various fields of pest control and the mode of employment depends entirely on the intended use. The active compounds can be used as such, e. g. in powder form, in the form of gas or mist or as smoke. For most purposes, however, it is more economical to combine them with suitable carriers and distributing agents. A number of such substances suitable for the usual forms of application such as dusting agents, spraying agents (suspensions), solutions, aerosols, emulsions and semisolid preparations (ointments) are given below.

As solid pulverulent carriers may be used, e. g. calcium carbonate, in the form of whiting or ground limestone, kaolin, bole, bentonite, talcum, powdered magnesia, kieselguhr, boric acid, tricalcium phosphate, and also powdered wood, powdered cork and other materials of a vegetable nature. By the addition of wetting agents and protective colloids the pulverulent preparations can be suspended in water and used as spraying agents. The active substance can be combined with the carrier for example by impregnating the carrier with solutions of the active ingredients, by mixing the molten active ingredients with the carriers, or by milling the components together.

Solutions (for spraying) in high boiling carrier solvents such as kerosene and similar mineral oil fractions, in methyl naphthalenes, xylenes, etc., are best suited for direct spraying of objects. They can also be used for impregnating wood. Solutions in lower boiling solvents such as trichlorethylene, tetrachlorethane, ethylene chloride are most suitable for spreading the active ingredient in the form of a mist. The latter solvents, and also, for example, benzine, xylene and chlorobenzene are also suitable for the impregnation of textiles. The active substances are soluble in water to some extent. Water, therefore, if required with the addition of solvents, also comes into consideration as a carrier-solvent and also water soluble organic solvents such as alcohol or acetone.

Fluoro-trichloromethane and difluoro-dichloromethane are examples of solvents and propelling agents for aerosols.

As emulsifying agents there come into consideration those of a cation-active nature such as quaternary ammonium compounds, anion-active agents such as soap, soft soap, resin soap, aliphatic monoesters of sulphuric acid and aliphatic aromatic sulphonic acids, and also non-ionogenic emulsifying agents such as higher molecular ethylene oxide condensation products. They are mixed to an emulsifiable concentration with the active ingredients with or without the addition of suitable solvents such as e. g. acetone, alcohols, cyclohexanone, benzene, toluene, xylene, tetrahydronaphthalene, alkylated naphthalenes, phthalic acid esters, mineral and vegetable oils, resins, and if required, water.

Petroleum jelly and other ointment bases in which the active ingredient can be incorporated are examples of semi-solid distributing agents.

The active ingredients can also be used together with attractives or lures to form a bait, such as, e. g. sugar, for example in the form of dusting agents with sugar as the main carrier, or spraying agents or in the form of fly-papers.

The various forms of application can generally be adapted to the intended use by the addition of substances which improve the distribution, the adheisve properties and resistance to rain on the treated surface, such as, e. g. fatty acids, resins, wetting agents, glue, casein or alginates. The biological activity can also be increased by the addition of substances with bactericidal, fungicidal or also insecticidal properties.

As bactericidal substances that can be added come into consideration, e. g. chlorinated phenols and quaternary ammonium compounds, suitable fungicidal compounds include e. g. sulphur in its various forms of application, such as lime-sulphur liquid, copper compounds such as copper oxychloride or Bordeaux liquid and fluorides. As examples of further insecticidal compounds may be named: synthetic products like 1.1-bis-(p-chlorophenyl)-2.2.2-trichlorethane, γ - hexachlorocyclohexane, p - nitrophenyl - di - ethyl - thiophosphate, tetra - ethyl-pyrophosphate, chlorinated camphene, 1.2.4.5.6.7.8.8-octachloro - 4.7 - methano - 3a.4.7.7a - tetrahydroindane and 5.5 - dimethyl - dihydroresorcinoldimethyl carbamate. Pyrethrin and rotenone are suitable vegetable products.

*Example 3.—Sprinkling agent (spray)*

(a) 2 parts of active ingredient, e. g. 2-n-propyl-4-methyl - pyrimidyl - (6) - dimethyl carbamate are dissolved in 10 parts of xylene and 88 parts of kerosene.

(b) 2 parts of active ingredient, e. g. 2.4-dimethyl-pyrimidyl-(6)-dimethyl carbamate and 3 parts of 1.1-bis-(p - chlorophenyl) - 2.2.2 - trichlorethane are dissolved in 10 parts of xylene or another mutual solvent and 85 parts of kerosene.

Both solutions are excellently suited for combatting flies in the household and also in storerooms and slaughter-houses.

*Example 4.—Fumigating agent*

(a) 20 parts of active ingredient, e. g. 2-n-propyl-4-methyl-pyrimidyl-(6)-dimethyl carbamate are mixed with 61 parts of sawdust which has previously been impregnated with 18.4 parts of potassium nitrate. The mass is shaped into tablet form under pressure.

(b) 50 parts of active ingredient, e. g. 2.4-dimethyl-pyrimidyl-(6)-dimethyl carbamate, 22 parts of sugar, 12 parts of potassium chlorate, 2.4 parts of potassium nitrate and 13.6 parts of sawdust are ground and thoroughly mixed together. The mass is put into boxes and it is set alight by either a wick or a fuse.

The insecticidal smoke formed by burning the tablets or the boxed fumigating mass is specially suitable for combatting insects in enclosed spaces.

*Example 5.—Gas*

2 - ethyl - 4 - methyl - pyrimidyl - (6) - dimethyl carbamate either as such or with suitable additives which held vaporisation by heating, e. g. on an electrically heated plate, is evaporated and in this way kills insects in enclosed spaces.

What we claim is:

1. As new chemical compounds, the dimethyl carbamates of the general formula:

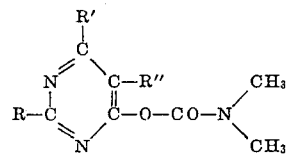

wherein R and R' represents lower alkyl radicals, and R" represents a member selected from the group consisting of hydrogen and lower alkyl radicals.

2. As new chemical compound, the 2.4-dimethyl-pyrimidyl-(6)-dimethyl carbamate.

3. As new chemical compound, the 2-ethyl-4-methyl-pyrimidyl-(6)-dimethyl carbamate.

4. As new chemical compound, 2-n-propyl-4-methyl-pyrimidyl-(6)-dimethyl carbamate.

References Cited in the file of this patent

UNITED STATES PATENTS

| Number | Name | Date |
|---|---|---|
| 2,489,247 | Wuest | Nov. 22, 1949 |

OTHER REFERENCES

Chemical Abstracts, 4th decennial index (1937–46), p. 8416.